US008831245B2

(12) United States Patent
Fabas et al.

(10) Patent No.: US 8,831,245 B2
(45) Date of Patent: Sep. 9, 2014

(54) METHOD AND DEVICE FOR MODIFYING THE SOUND VOLUME OF AN AUDIO ALARM SIGNAL ONBOARD AN AIRCRAFT

(75) Inventors: Nicolas Fabas, Castelmaurou (FR); Baptiste Maylin, Toulouse (FR)

(73) Assignees: Airbus Operations SAS, Toulouse (FR); Airbus, Blagnac (FR)

(*) Notice: Subject to any disclaimer, the term of this patent is extended or adjusted under 35 U.S.C. 154(b) by 917 days.

(21) Appl. No.: 12/058,349

(22) Filed: Mar. 28, 2008

(65) Prior Publication Data

US 2009/0189786 A1 Jul. 30, 2009

(30) Foreign Application Priority Data

Mar. 30, 2007 (FR) ...................................... 07 54196

(51) Int. Cl.
*H04R 5/04* (2006.01)
*G01C 23/00* (2006.01)
*H04S 3/00* (2006.01)

(52) U.S. Cl.
CPC ................ *G01C 23/00* (2013.01); *H04S 3/006* (2013.01)
USPC ............. 381/104; 381/86; 381/106; 381/107; 381/108; 381/109

(58) Field of Classification Search
CPC .......................... H04R 2201/028; H04R 5/04
USPC .................................................... 340/901, 945
See application file for complete search history.

(56) References Cited

U.S. PATENT DOCUMENTS

| 4,060,793 | A | * | 11/1977 | Bateman | 340/970 |
| 4,619,110 | A | * | 10/1986 | Moore | 60/39.091 |
| 2004/0245409 | A1 | * | 12/2004 | Cordina et al. | 244/185 |
| 2006/0123080 | A1 | * | 6/2006 | Baudino et al. | 709/204 |

FOREIGN PATENT DOCUMENTS

| EP | 1 445 721 A2 | 8/2004 |
| GB | 2 343 956 A | 5/2000 |
| JP | 361287309 A | * 12/1986 |

* cited by examiner

*Primary Examiner* — Julio J Maldonado
*Assistant Examiner* — Mohammad Choudhry
(74) *Attorney, Agent, or Firm* — Oblon, Spivak, McClelland, Maier & Neustadt, L.L.P.

(57) ABSTRACT

A method for modifying a current sound-volume value assigned by an on-board system to an acoustic alert signal emitted on board an aircraft is provided. The method includes furnishing, on board the aircraft, the on-board system with at least one information item defining a modification of the current sound-volume value to a new sound-volume value in accordance with a predetermined rule.

19 Claims, 2 Drawing Sheets

METHOD AND DEVICE FOR MODIFYING THE SOUND VOLUME OF AN AUDIO ALARM SIGNAL ONBOARD AN AIRCRAFT

BACKGROUND OF THE INVENTION

I. Field of the Invention

The present invention relates to a method and an associated device for modifying a sound-volume value of an acoustic alert signal emitted on command on board an aircraft.

II. Description of Related Art

In an aircraft cockpit, the flight warning system (or alarm calculator) is intended to forewarn the crew members of an abnormal situation concerning monitored systems of the airplane, which may include detectors or calculators relating, for example, to the engines or fuel tanks.

The acoustic signals generated in the cockpit by the warning system, known as acoustic warnings and intended to forewarn the crew of an abnormal situation, may comprise diverse sounds, voice syntheses or a mix of sounds and voice syntheses (known as "hybrid" mixes).

Diverse technologies exist for flight warning systems. The on-board systems are generally constructed on the basis of specific electronics integrated into the airplane (embedded systems).

In the Airbus A320 and A330/A340 family, for example, the alarm system is a unit that can be replaced on-line (LRU for "Line Replaceable Unit" and is known as "Flight Warning Computer" (flight warning computer). In the A380 and A400M family, the alarm system is a software program known as "Flight Warning Application" (flight warning application), executed by modules that can be replaced on-line (LRN for "Line-Replaceable Module"), which integrate the integrated modular avionic technology (IMA: "Integrated ModularAvionics").

The industrial development of an aircraft warning system passes through the finalization of a system standard (ready-to-use version serving as reference, or de facto standard applicable to different participants in the aircraft development process as well as to the users). The production of a new on-board system standard involves numerous industrial participants as well as extensive logistics, and it is therefore costly.

In addition, if an alarm system is to be installed in a commercially operated airplane, it must be certified by certification authorities. During the industrial phase of mass production of the airplane, a warning system standard is certified approximately every year.

When such an alarm system generates a sound level that is too faint, it can cause the crew to misunderstand or misinterpret an abnormal or emergency situation.

Conversely, a sound level that is too loud may represent a nuisance for the members of the crew while they perform their tasks.

When this type of situation is observed, for example by a crew in the course of a development or operational phase, in connection with one or more acoustic warning signals, the solution currently used to correct the inappropriate sound level is to design a new alarm system standard that integrates the readjusted sound levels. In addition, the new alarm system standard must then be certified, thus imposing further delays.

The manufacturers and the airline companies are therefore confronted with the problem of the length of delays necessary for adjustment of the sound level of acoustic warnings.

This problem is exacerbated by the technical complexity and the lack of flexibility of the current methods.

BRIEF SUMMARY OF THE INVENTION

To solve at least one of the aforesaid problems, there is proposed a method for modifying a current sound-volume value assigned by a reconfigurable on-board system to an acoustic alert signal emitted on board an aircraft, characterized in that the method comprises a step, effected on board the aircraft, of furnishing the said on-board system with at least one personalization information item defining a modification of the said current sound-volume value to a new sound-volume value in accordance with a predetermined rule.

This method, applied to an operational on-board system, allows simple, quick and effective modification of a sound-volume value of an alert signal in the course of a maintenance operation, since an information item defining such a modification is furnished to the on-board system, which can then assign the new sound-volume value to the acoustic alert signal. This method benefits from the reconfigurable nature of the on-board system, or in other words from the fact that the operating parameters and data of the system are not fixed but to the contrary can be redefined according to needs. It permits the sound-volume values of an on-board system to be modified without producing a new standard for the on-board system. It is recalled that personalization occurs when the user (in this case the airline company) takes charge of a manufactured product (in this case the aircraft) and modifies it to adapt it to its own intended use.

It is noted that the assignment of a sound-volume value to an acoustic alert signal by the on-board system can be accomplished, in a manner known to those skilled in the art, by way of devices such as a sound-processing card or an acoustic emissions management unit.

This method may be advantageously implemented for several alert signals simultaneously, or even for a large number of signals at once. If offers great reactivity when problems of poor adjustments are encountered, since the crews using the system can then rapidly observe whether the modification made is well adapted.

Preferably the method additionally comprises a step of modification of the said current value in the on-board system as a function of the said at least one information item concerning modification according to the said predetermined rule.

This method permits such a modification to be made simply, quickly and effectively.

It will be noted that the modification of the current value can be accomplished, in a manner known to those skilled in the art, in a memory of the on-board system.

Preferably the current value and the new value are chosen from among a plurality of possible values stored in memory in the on-board system.

That offers the advantage of simplicity of use of the method by the personnel performing maintenance: according to instructions given by the aircraft manufacturer, the operator merely has to choose the new sound-volume value from among a plurality of values predefined in the flight alarm system.

Preferably, since the on-board system is a first on-board system, the said furnishing step comprises a sub-step of introduction of the said at least one information item into a second on-board system of the said aircraft, one of the functions of this system being to permit introduction of information items originating outside the aircraft into the on-board electronics of the aircraft.

This characteristic makes it possible to enter the information item or items defining a modification of the sound volume in an on-board system of the aircraft, one of the functions of this system being to permit introduction of information items originating outside the aircraft into the on-board electronics of the aircraft.

It will be noted that the first and second on-board systems are not necessarily distinct and may be one and the same system.

The furnishing step may also comprise a sub-step in which the said information item is made available to the said first on-board system by the said second on-board system, distinct from the first. The modification information item or items then is/are saved in the second system, and the first system accesses them there or searches for them at the appropriate time in order to implement the update.

The furnishing step may also comprise a sub-step of transfer of the said information item from the second on-board system to the first on-board system, distinct from the second, a sub-step also implemented when the first system is ready to proceed with the update.

According to one embodiment, the said furnishing step is effected by way of a man-machine interface.

This characteristic permits a maintenance operator or any other person to proceed with an update simply and quickly by entering, on a keyboard, for example, an information item defining the desired modification.

It will be noted that the man-machine interface may be controlled by the second on-board system or may be part of it.

According to one embodiment, the said furnishing step is effected by way of a downloading interface.

This characteristic offers the advantage that a large number of information items defining a large number of modifications of sound volumes of different acoustic warnings can be furnished to the on-board system in quick, simple and automated manner.

It is noted that the downloading interface may be controlled by the second on-board system or may be part of it.

Preferably the said at least one information item comprises a new sound-volume value for the said acoustic signal, and the said predetermined rule is that the said current value is replaced by the said new value.

This characteristic offers the advantage of simplicity of use of the method, since this rule is very simple to use and can be understood directly by the different persons involved in the modification process.

According to one embodiment, the said at least one information item comprises a value increment, and the said rule is that the new value is determined by incrementing the said first value by the said value increment.

This characteristic offers the advantage of simplicity of use of the method, since only the information items in relative values are necessary to achieve the modification.

Preferably, when the current value and the new value are selected from among a plurality of possible sound-volume values, this plurality of values is sampled on a discrete scale, meaning that the values of the plurality are included in the values of a discrete scale.

According to a preferred embodiment, a sound-processing card converts the said sound-volume values sampled on a discrete scale into physical sound-volume signals under control of the first on-board system.

Thus the equipment necessary for implementation of this characteristic can be achieved simply.

Preferably the said plurality of possible sound-volume values is sampled on a scale that includes a value for which the said acoustic warning, for example, converted by a sound-processing card, is silent.

This characteristic makes it possible to easily suppress the emission of an acoustic warning.

Preferably the on-board system comprises a flight warning system executed by an avionic module.

The flight warning system is a sensitive on-board system that must be certified in order to be installed in an aircraft. By virtue of the invention, in addition to the fact that production of a new standard is avoided, a modification of an important parameter of the flight warning system is effected without having to request a complete new certification of a system standard.

According to a second aspect of the invention, it proposes an aircraft subassembly comprising an on-board system capable of assigning a current sound-volume value to an acoustic alert signal emitted on board an aircraft, characterized in that the said subassembly comprises means of furnishing, on board the aircraft, at least one personalization information item defining a modification of the said current sound volume to a new sound-volume value in accordance with a predetermined rule.

By virtue of this aircraft subassembly, a sound-volume value of an alert signal can be modified simply and quickly, since an information item defining such a modification is furnished to the on-board system, which can then assign the new sound-volume value to the acoustic alert signal.

Preferably the said aircraft subassembly additionally comprises means for modifying the said current value in the on-board system as a function of the said at least one modification information item according to the said predetermined rule.

Preferably, since the said on-board system is a first on-board system, the aircraft subassembly comprises means for introducing the said at least one information item into a second on-board system of the said aircraft, one of the functions of this system being to permit introduction of information items originating outside the aircraft into the on-board electronics of the aircraft. The second on-board system may or may not be part of the aircraft subassembly.

Preferably the aircraft subassembly according to the invention is provided with a man-machine interface, by way of which the said furnishing step is effected.

Preferably the aircraft subassembly according to the invention is provided with a downloading interface, by way of which the said furnishing step is effected.

Preferably the aircraft subassembly is such that the said on-board system comprises a flight warning system executed by an avionic module.

The invention also proposes an aircraft comprising an aircraft subassembly such as defined hereinabove.

Other characteristics and advantages of the invention will become apparent in light of the detailed description hereinafter with reference to the figures, each of which represents an embodiment of the method and of the device according to the invention.

DETAILED DESCRIPTION OF THE INVENTION

Figure 1:
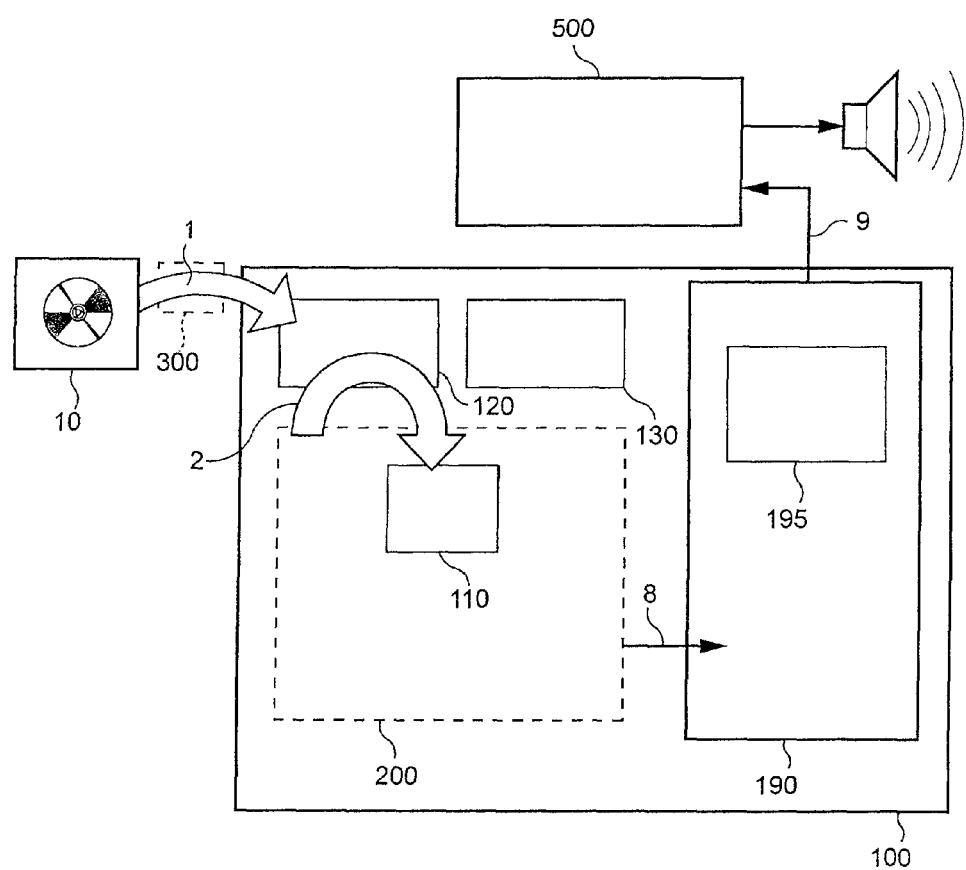
FIG. 1 shows an aircraft on-board system according to a first embodiment of the present invention.

According to a first embodiment, which is the preferred mode, a first reconfigurable aircraft on-board system represented in FIG. 1 comprises an application 200 executed by an avionic module 100.

Application 200 is an on-board flight monitoring system (known in English terminology by the term "Flight Warning System") in software form ("Flight Warning Application"). It surveys numerous data derived from all the systems of the aircraft, and in certain warning situations generates commands to emit acoustic (sounds, syntheses and hybrids) and visual (indicator lights or texts: memos and procedures, etc.) warning messages.

In the described embodiment, this avionic module is an integrated modular avionic module, and more precisely an LRM, in this case a CPIOM module (an acronym representing in English terminology "Core Processing & Input-Output Module"), which is a shared calculating resource capable of exchanging input and output data with other electronic modules.

Avionic module 100 comprises a sound-processing card 190 (audio card) containing an audio database 195, composed of files of WAV format (for "WAVEform audio format"). Certain of these files correspond to sounds, others to voice syntheses and others to mixes of sounds and voice syntheses (known as hybrid mixes).

Sound-processing card 190 is connected to an acoustic-signal management unit known as AMU (for "Audio Management Unit" or "Audio Multiplexer Unit") 500, receiving signals from other sound-processing cards, for example from the processing card of a system for monitoring the environment of the aircraft, known as AESS (an acronym for "Aircraft Environment Surveillance System").

Application code 200 is recorded in a memory (not illustrated) of avionic module 100. Nevertheless, application code 200 can be recorded in a memory that is not contained in module 100 or can be distributed in the memories of several modules, the calculating resources being shared, as has been seen.

In warning situations, the commands to emit acoustic warning messages, denoted by reference 8 in FIG. 1, are sent by application 200 to sound-processing card 190.

To generate these commands 8, application 200 uses data defining the content of acoustic warnings in the form of a code designating one of the files of WAV format of audio database 195 and data defining the volume of the acoustic warnings.

The current data on sound volume are recorded in a portion of memory 110 (or memory zone) of avionic module 100.

In addition, in this example, the content data are recorded in the same memory portion 110 as the volume data, although alternatively they could be recorded elsewhere.

Memory portion 110 is a random-access memory portion, but it could be a portion of rewritable read-only memory or another type of memory.

A correspondence is established between each content datum and a sound-volume datum, thus permitting application 200 to assign a sound-volume datum to each content datum of the acoustic warning. In the described embodiment, the content and volume data are stored in a two-column table, which contains one volume datum per content datum.

The flight warning system also communicates with the pilots by way of the ECAM (acronym for "Electronic Centralized Aircraft Monitor" or centralized electronic monitoring system, also known as EICAS for "Engine Indication and Crew Alerting System" in certain architectures), which is an assembly of display systems in the all-screens instrument panel environment ("glass cockpit") of an aircraft.

Application 200 is designed such that the volume data can be modified without the need to change the application, thus making it possible to avoid production of a new system standard (see the introduction). This is why application 200 is said to be reconfigurable.

A memory portion 120 is intended to contain a database for personalization of application 200. In the presented embodiment, this memory portion 120 is inside avionic module 100, but it could be located in another avionic module, which may or may not be dedicated to another on-board system.

A second memory portion 130 of avionic module 100 is intended to contain another database for personalization of application 200.

By convention, one of memory portions 120 and 130 is intended to receive a database developed by the manufacturer, and the other memory portion is intended to receive a database developed by the airline company that operates the airplane.

These two databases contained in memory portions 120 and 130 are empty by default.

After a decision to modify sound volume parameters of the flight warning application has been made and a series of technical specifications pertaining to this modification has been defined, a personalization database 10 is formulated by means of a dedicated software program.

This operation may be carried out by the manufacturer, by the airline company that operates the aircraft or by maintenance agents acting on behalf of the manufacturer or of the company. It is effected on the ground by means of a tool for production of personalization databases, and it may last one month or even less.

Each of these databases can contain different types of information items.

In the described embodiment, the database contained in memory portion 120 is intended by convention to contain, among other data, personalization information items that defining modifications of data or sound-volume values contained in memory portion 110 in accordance with a predetermined rule.

By convention defined in application 200, the database contained in memory portion 120 is a relative database: it contains the required evolutions (or value increments) defined relative to the sound-volume data contained in memory portion 110.

According to this predetermined data-modification criterion, the new sound-volume values are determined by incrementing current values respectively by values corresponding to the increments in question.

The scale used for sound-volume values is defined in application 200 in relation to the characteristics of avionic module 100 and its audio card 190 for a given audio alert signal.

These values can be assigned to the audio signal by the on-board system.

In the illustrated embodiment, there is used a discrete scale: the sound-volume values can take only predefined values. They cannot take all the intermediate values as on a continuous scale.

In addition, the scale used is finite: the number of predefined values is limited to a certain number of values.

The increments may be positive or negative, and may therefore define acoustic amplifications or attenuations of the audio signals in question.

In addition, a particular sound-volume value indicates, by convention defined in application 200, total attenuation of the acoustic signal, meaning that the amplitude of the acoustic signal is equal to zero.

As an alternative, it will be noted that the scale of sound volume values could be continuous and finite, discrete and infinite or continuous and infinite, without departing from the scope of the invention.

When a decision is made to modify or update the sound-volume level of an acoustic signal, a computer department on the ground constructs a personalization database 10 that contains, for each acoustic alert signal, a personalization information item indicating by what increment the sound volume of such signal must be amplified or attenuated. The increment may be positive, negative or zero, and it is read on the scale mentioned hereinabove.

This decision is made, for example, following a request for improvement, indicating poor adaptation of a sound volume.

Database 10 containing the information items for modification of the current sound-volume value of one or more signals is then furnished to the on-board flight warning system (step 1 in FIG. 1). In the described embodiment, this furnishing operation corresponds to introduction, into the on-board electronics of the aircraft, by way of a second on-board system, in the present case a data-downloading system 300 known as DLCS. This is an on-board system dedicated to data loading and configuration intended for all the avionic systems, and the acronym for which, in English terminology, means "Data Loading & Configuration System".

It is recalled that, in integrated modular avionic architectures, communication between the different systems takes place, for example, via multiplexed communication networks composed of a broadcast bus or of Ethernet cables. Other means of electrical communication in networks also may be used.

A maintenance operator uses a maintenance computer, which can be, for example, a PC-compatible computer installed permanently in the airplane or a portable computer linked by a temporary connection to the on-board electronics.

Into this computer the operator inserts a memory medium, such as a CD ROM or a USB key containing database 10. Database 10 also can be stored in advance in the computer if the latter is portable. Alternatively, a radio network can be used to communicate with a server external to the airplane and thus transfer the data remotely.

Database 10 is communicated to data-downloading system 300, which makes it available to the flight warning system, by recording it in memory portion 120 mentioned above.

Application 200 possesses a personalization function: once it has been loaded into module 100, the personalization database is then interpreted by application 200, which consequently modifies the sound-volume characteristics of the sound signals in memory portion 110 (step 2 in FIG. 1). Application 200 applies the corresponding increment to each current sound-volume value in order to obtain the desired new value (updated value).

In a flight situation in which the flight warning system detects a warning situation, application 200 sends a request to audio card 190 of avionic module 100, with precise indication of the sound code or of the voice synthesis as well as the sound level recorded in memory zone 110. This request is made in the form of hexadecimal codes.

Sound card 190 translates the sound level transmitted thereto into a physical sound-volume value. It then sends a request to the AMU ordering emission of the selected sound signal, this request including the characteristics of the corresponding WAV file and the physical sound-volume value.

In the described embodiment, the scale used is discrete and finite, and comprises four attenuation or amplification levels: LEVEL 0, the default level, and LEVEL 1, LEVEL 2 and LEVEL 3, which are three attenuation or amplification levels.

More precisely, LEVEL 1 corresponds to an amplification of 6 dB (6 decibels), LEVEL 2 to an attenuation of 6 dB and LEVEL 3 to an attenuation of 12 dB.

The hexadecimal codes used in the protocol for the request from the flight warning application of the A380 to the audio card of avionic module 100 include a code to stop acoustic emission, an error acknowledgment code, a code for identification of the acoustic emission (sound or voice synthesis), a code designating the base sound level without attenuation (LEVEL 0), a code indicating an attenuation of 6 decibels, codes indicating the alternating levels provided on the scale described hereinabove (LEVEL 1, LEVEL 2, LEVEL 3), codes indicating superposition of an attenuation of 6 decibels and alternating levels provided on the scale described hereinabove, and finally codes for the length of the acoustic emission (short or continuous).

In the case in which the acoustic emission is a voice synthesis, the protocol also uses codes that command immediate or deferred stop of a synthesis, and a code indicating the number of patterns.

Figure 2:
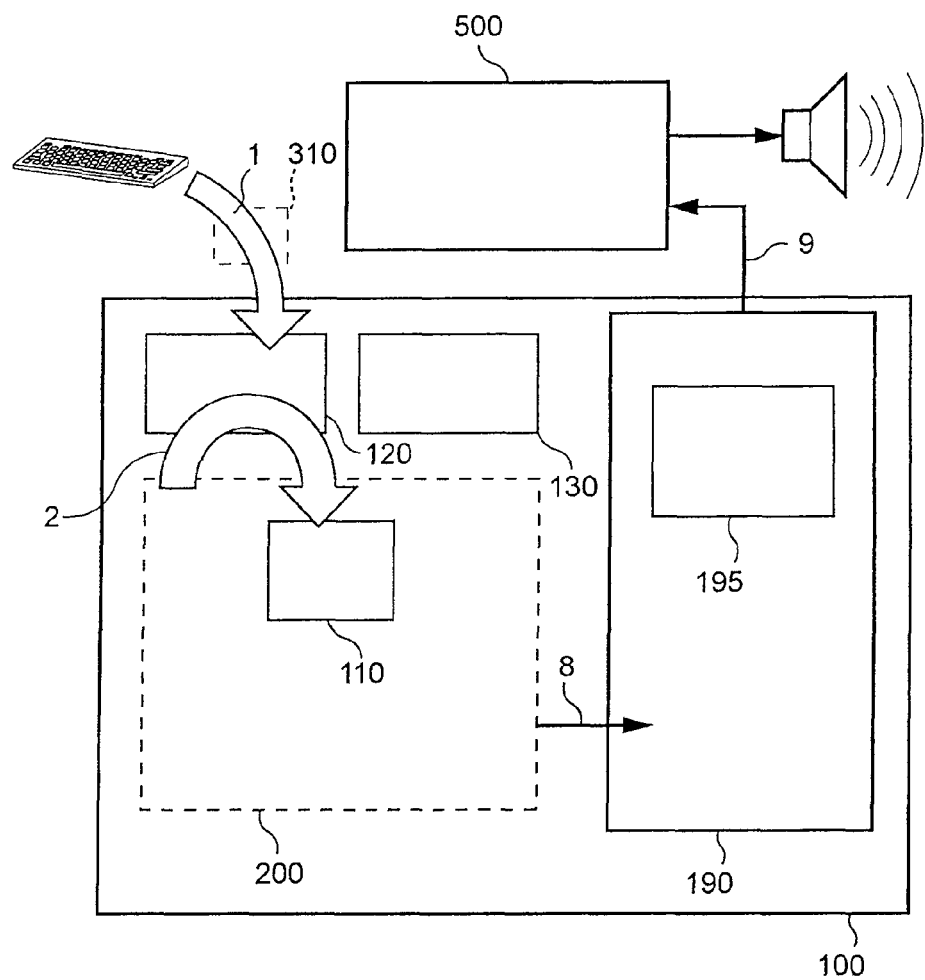
FIG. 2 shows an aircraft on-board system according to a second embodiment of the present invention.

In a second embodiment, the introduction of the information item defining a modification of the sound level of a sound or of a voice synthesis takes place manually via a man-machine interface. This interface is an on-board maintenance terminal controlled by centralized maintenance system 310, known as CMS (acronym for "Central Maintenance System") communicating with the incorporated test function known as BIT (acronym for "Built-In Test"; also known as BITE for "Built-In Test Equipment") of the warning system, the BIT function operating in interactive mode. FIG. 2 represents this alternative.

According to a variant of the two described embodiments, the personalization database introduced into the on-board system contains new sound levels in absolute value and not incrementing values. The modification of current values of signals is then effected according to another predetermined rule. Once the database is loaded into module 100, the new sound-volume values replace the old values (current values) in memory zone 110.

Finally, it will be noted that the present invention is not limited to the embodiment described hereinabove and represented in the figures. It also relates to all alternative embodiments conceivable to those skilled in the art.

In particular, the invention is not limited to modification of a sound volume of a signal generated by a flight alarm system, but it is applicable to modification of a sound volume generated by any system whatsoever on board an aircraft.

In addition, the invention can be implemented with diverse avionic module architectures, especially with LRUs.

The invention claimed is:

1. A method for modifying a current sound-volume data value indicating a current sound-volume value, that has previously been stored in a memory and assigned by an on-board system to an acoustic alert signal including at least one content datum, reproduced on board an aircraft by a loudspeaker, wherein the on-board system is reconfigurable by redefining parameters and data of the system, the method comprising:

furnishing, on board the aircraft, the on-board system with at least one personalization information data item that is stored in the memory or another memory and that defines a modification of the current sound-volume value to a new sound-volume value in accordance with a predetermined rule; and modifying the current sound-volume value by replacing the current sound-volume value stored in the memory with the at least one personalization information data item stored in the memory or said another memory to make the new sound-volume value the current sound-volume value, wherein a correspondence is established between each content datum and current sound-volume datum so that a current sound-volume datum is assigned to each content datum.

2. The method according to claim 1, wherein, the on-board system is a first on-board system, and said furnishing includes introducing the at least one information data item into a second on-board system of the aircraft, one of the functions of the second on-board system being to permit introduction of information items originating outside the aircraft into on-board electronics of the aircraft.

3. The method according to claim 1, wherein said furnishing is effected by way of a man-machine interface.

4. The method according to claim 1, wherein said furnishing is effected by way of a downloading interface.

5. The method according to claim 1, wherein the at least one information data item comprises the new sound-volume value for the acoustic alert signal, and the predetermined rule is that the current sound-volume value is replaced by the new sound-volume value.

6. The method according to claim 1, wherein the information data item comprises a value increment, and the predetermined rule is that the new sound-volume value is determined by incrementing the current sound-volume value by the value increment.

7. The method according to claim 1, wherein the on-board system comprises a flight warning system executed by an avionic module.

8. The method according to claim 1, further comprising:
producing a personalization database comprised of the at least one personalization information data item defining a modification of the current sound-volume value.

9. An aircraft subassembly, comprising:
an on-board system configured to assign a current sound-volume data value indicating a current sound-volume value, that has previously been stored in a memory, to an acoustic alert signal including at least one content datum, emitted on board an aircraft, wherein the on-board system is reconfigurable by redefining parameters and data of the system, and the subassembly includes circuitry configured to furnish, on board the aircraft, at least one personalization information data item that is stored in the memory or another memory and that defines a modification of the current sound volume to a new sound-volume value in accordance with a predetermined rule, and modify the current sound-volume value by replacing the current sound-volume value stored in the memory with the at least one personalization information data item stored in the memory or said another memory to make the new sound-volume value the current sound-volume value, wherein a correspondence is established between each content datum and current sound-volume datum so that a current sound-volume datum is assigned to each content datum.

10. The aircraft subassembly according to claim 9, further comprising:
a tool configured to produce a personalization database comprised of the at least one personalization information data item defining a modification of the current sound-volume value.

11. An aircraft comprising the aircraft subassembly according to claim 9.

12. The method according to claim 1, further comprising:
establishing a correspondence between each content datum and a sound-volume datum.

13. The method according to claim 12, further comprising:
storing the content datum and the sound-volume datum in a table stored in the memory.

14. The method according to claim 1, wherein the sound-volume values are predetermined values.

15. The method according to claim 14, wherein the sound-volume values are four predetermined values.

16. The method according to claim 14, wherein a sound-volume value corresponds to an amplification of 6 db.

17. A method for modifying a current sound-volume data value indicating a current sound-volume value, that has previously been stored in a memory, assigned by an on-board system to an acoustic alert signal, including at least one content datum, reproduced on board an aircraft by a loudspeaker, wherein the on-board system is reconfigurable, the method comprising:

furnishing, on board the aircraft, the on-board system with at least one personalization information data item that is stored in the memory or another memory and defines a modification of the current sound-volume value to a new sound-volume value in accordance with a predetermined rule, the personalization information data item including a sound-volume value increment, and the predetermined rule is that the new sound-volume value is determined by incrementing the current sound-volume value by the sound-volume value increment, establishing a correspondence between each content datum and current sound-volume datum so that a current sound-volume datum is assigned to each content datum, and modifying the current sound-volume value by replacing the current sound-volume value stored in the memory with the at least one personalization information data item stored in the memory or said another memory to make the new sound-volume value the current sound-volume value.

18. The method according to claim 1, wherein the current sound-volume value and the new sound-volume value are chosen from among a plurality of possible values stored in the memory or the other memory.

19. The method according to claim 13, wherein the content data and the current sound-volume data are stored in a two-column table which contains one current sound-volume datum per content datum.

* * * * *